US012428874B2

(12) United States Patent
Lin et al.

(10) Patent No.: US 12,428,874 B2
(45) Date of Patent: Sep. 30, 2025

(54) ELECTRONIC LOCK WITH MORTISE INSERT

(71) Applicant: ASSA ABLOY Americas Residential Inc., New Haven, CT (US)

(72) Inventors: James Lin, Laguna Niguel, CA (US); Elena Gorkovenko, Mission Viejo, CA (US); Mark Bloom, Ladera Ranch, CA (US); Elliott Schneider, Foothill Ranch, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 56 days.

(21) Appl. No.: 18/067,107

(22) Filed: Dec. 16, 2022

(65) Prior Publication Data

US 2023/0193660 A1 Jun. 22, 2023

Related U.S. Application Data

(60) Provisional application No. 63/291,131, filed on Dec. 17, 2021.

(51) Int. Cl.
*E05B 63/08* (2006.01)
*E05B 47/02* (2006.01)
(Continued)

(52) U.S. Cl.
CPC .............. *E05B 63/08* (2013.01); *E05B 47/02* (2013.01); *E05B 49/00* (2013.01); (Continued)

(58) Field of Classification Search
CPC .... E05B 47/0012; E05B 47/02; E05B 47/026; E05B 2047/0054; E05B 2047/0058; (Continued)

(56) References Cited

U.S. PATENT DOCUMENTS 4,683,741 A * 8/1987 Fields .................... E05B 17/10 70/432
5,488,195 A * 1/1996 Mickel .................... G10H 1/26 340/5.33
(Continued)

FOREIGN PATENT DOCUMENTS

CN 105178705 12/2015
CN 106150218 11/2016
(Continued)

OTHER PUBLICATIONS

International Search Report and Written Opinion for PCT/US22/81655, dated Mar. 9, 2023.

*Primary Examiner* — Christopher J Boswell
(74) *Attorney, Agent, or Firm* — Merchant & Gould P.C.

(57) ABSTRACT

An electronic lock assembly includes an exterior assembly, an interior assembly, and a latch having a deadbolt movable between an extended position and a retracted position, the latch being movable in response to rotation of a torque blade. The electronic lock includes a motor within the interior assembly and operable to rotate the torque blade, and a control circuit operatively connected to the motor and configured to selectively actuate the motor. A mortise insert includes a battery subassembly electrically connectable to the control circuit.

23 Claims, 11 Drawing Sheets

(51) Int. Cl.
*E05B 49/00* (2006.01)
*E05B 47/00* (2006.01)

(52) U.S. Cl.
CPC ... *E05B 47/0012* (2013.01); *E05B 2047/0058* (2013.01); *E05B 2047/0091* (2013.01)

(58) Field of Classification Search
CPC ..... E05B 2047/0067; E05B 2047/0084; E05B 2047/0091; E05B 2047/0095; E05B 49/00; E05B 63/08
See application file for complete search history.

(56) References Cited

U.S. PATENT DOCUMENTS

| | | | | |
|---|---|---|---|---|
| 5,531,086 | A * | 7/1996 | Bryant | E05B 63/0004 70/279.1 |
| 5,979,199 | A | 11/1999 | Elpern et al. | |
| 6,580,355 | B1 * | 6/2003 | Milo | E05B 47/0012 70/277 |
| 6,619,705 | B2 | 9/2003 | Dalsing | |
| 6,865,916 | B2 | 3/2005 | Goldman | |
| 6,978,646 | B2 | 12/2005 | Raatikainen | |
| 7,275,402 | B2 | 10/2007 | Luling et al. | |
| 7,303,215 | B2 | 12/2007 | Moon et al. | |
| 7,501,930 | B2 | 3/2009 | Cote et al. | |
| 7,591,160 | B2 | 9/2009 | Keller | |
| 7,690,230 | B2 * | 4/2010 | Gray | E05B 47/00 70/91 |
| 8,234,892 | B2 | 8/2012 | Laverty et al. | |
| 8,495,836 | B2 | 7/2013 | Lowder et al. | |
| 8,544,302 | B2 | 10/2013 | Goldman | |
| 8,555,685 | B2 | 10/2013 | Frolov et al. | |
| 8,683,833 | B2 | 4/2014 | Marschalek et al. | |
| 8,889,277 | B2 * | 11/2014 | Lakamraju | G07C 9/00174 70/277 |
| 8,978,428 | B2 | 3/2015 | Trent et al. | |
| 9,222,281 | B2 | 12/2015 | Fowler et al. | |
| 9,260,887 | B2 | 2/2016 | Lambrou et al. | |
| 9,284,750 | B2 | 3/2016 | Maeng et al. | |
| 9,334,676 | B2 | 5/2016 | Lambrou et al. | |
| 9,334,677 | B2 | 5/2016 | Grone et al. | |
| 9,378,596 | B2 * | 6/2016 | Shen | G07C 9/00174 |
| 9,500,007 | B2 | 11/2016 | Lambrou et al. | |
| 9,501,884 | B2 | 11/2016 | McIntyre et al. | |
| 9,512,644 | B2 | 12/2016 | Lambrou et al. | |
| 9,580,931 | B2 | 2/2017 | Myers et al. | |
| 9,657,501 | B2 | 5/2017 | Armari et al. | |
| 9,725,929 | B2 | 8/2017 | Picard et al. | |
| 9,890,565 | B2 | 2/2018 | Shiu et al. | |
| 10,125,518 | B2 | 11/2018 | Shiu et al. | |
| 10,316,549 | B2 * | 6/2019 | Nye-Hingston | E05B 63/08 |
| 10,323,437 | B2 | 6/2019 | Hallett | |
| 10,435,916 | B2 * | 10/2019 | Heisler | E05B 47/00 |
| 10,435,917 | B2 | 10/2019 | Nunez et al. | |
| 10,465,420 | B2 | 11/2019 | Heisler et al. | |
| 10,519,694 | B2 | 12/2019 | Lin et al. | |
| 10,570,645 | B2 | 2/2020 | Ellis et al. | |
| 10,612,271 | B2 | 4/2020 | Farag et al. | |
| 10,655,363 | B2 | 5/2020 | Piantek et al. | |
| 10,676,963 | B2 | 6/2020 | Vasudevan et al. | |
| 10,689,881 | B2 | 6/2020 | Wolfish et al. | |
| 10,724,271 | B2 | 7/2020 | Sangster et al. | |
| 10,801,235 | B2 | 10/2020 | Brown et al. | |
| 10,822,833 | B2 | 11/2020 | Mackle | |
| 10,829,959 | B2 | 11/2020 | Lowder | |
| 10,907,381 | B2 | 2/2021 | Lien | |
| 10,961,746 | B2 * | 3/2021 | Hood | E05B 63/08 |
| 10,988,957 | B2 | 4/2021 | Lowder | |
| 11,066,850 | B2 * | 7/2021 | Welbig | E05B 65/08 |
| 11,168,494 | B2 | 11/2021 | Compton | |
| 11,441,333 | B2 * | 9/2022 | Tagtow | E05B 47/026 |
| 2001/0010166 | A1 | 8/2001 | Doucet et al. | |
| 2002/0095883 | A1 | 7/2002 | Lindgren et al. | |
| 2003/0132829 | A1 | 7/2003 | Frolov et al. | |
| 2005/0185393 | A1 | 8/2005 | Eller et al. | |
| 2009/0058596 | A1 | 3/2009 | Sohanta et al. | |
| 2009/0178449 | A1 | 7/2009 | Raatikainen | |
| 2010/0011822 | A1 | 1/2010 | Ocana | |
| 2010/0192647 | A1 | 8/2010 | Gray | |
| 2010/0225128 | A1 | 9/2010 | Engel et al. | |
| 2012/0292925 | A1 | 11/2012 | Lundberg et al. | |
| 2013/0139561 | A1 * | 6/2013 | Parto | E05B 47/0611 70/278.7 |
| 2014/0175810 | A1 | 6/2014 | Lambrou et al. | |
| 2014/0250956 | A1 | 9/2014 | Chong | |
| 2016/0017640 | A1 * | 1/2016 | Soloway | E05B 63/08 70/91 |
| 2019/0112835 | A1 | 4/2019 | Yoo et al. | |
| 2019/0169877 | A1 | 6/2019 | Fishkin et al. | |
| 2019/0178007 | A1 | 6/2019 | Palmieri et al. | |
| 2019/0218826 | A1 | 7/2019 | Allen et al. | |
| 2019/0383056 | A1 | 12/2019 | Ouellette et al. | |
| 2020/0040605 | A1 | 2/2020 | Farag | |
| 2020/0270904 | A1 | 8/2020 | Lee et al. | |
| 2020/0392761 | A1 | 12/2020 | Gomez Garcia et al. | |
| 2021/0054663 | A1 | 2/2021 | Cheng | |
| 2021/0285254 | A1 | 9/2021 | Poire et al. | |
| 2024/0055712 | A1 * | 2/2024 | Ringwald | E05B 63/08 |

FOREIGN PATENT DOCUMENTS

| | | |
|---|---|---|
| CN | 108729759 | 11/2018 |
| CN | 108729766 | 11/2018 |
| CN | 108756510 | 11/2018 |
| CN | 108756511 | 11/2018 |
| CN | 108756513 | 11/2018 |
| CN | 108843149 | 11/2018 |
| CN | 109138640 | 1/2019 |
| CN | 109306826 | 2/2019 |
| CN | 110578427 | 12/2019 |
| CN | 111305654 | 6/2020 |
| CN | 210738299 | 6/2020 |
| CN | 111663856 | 9/2020 |
| CN | 112523615 | 3/2021 |
| CN | 113073907 | 7/2021 |
| EP | 1431481 | 6/2004 |
| EP | 1842989 | 10/2007 |
| EP | 2017410 | 1/2009 |
| EP | 2317039 | 5/2011 |
| EP | 2436858 | 4/2012 |
| EP | 2453083 | 5/2012 |
| EP | 2525022 | 11/2012 |
| EP | 2628876 | 8/2013 |
| EP | 2771528 | 9/2014 |
| EP | 2821569 | 1/2015 |
| EP | 2865827 | 4/2015 |
| EP | 2998478 | 3/2016 |
| EP | 2998487 | 3/2016 |
| EP | 3000952 | 3/2016 |
| EP | 3095934 | 11/2016 |
| EP | 3133558 | 2/2017 |
| EP | 3543439 | 9/2019 |
| EP | 3543440 | 9/2019 |
| EP | 3591149 | 1/2020 |
| EP | 3597843 | 1/2020 |
| EP | 3670794 | 6/2020 |
| EP | 3795786 | 3/2021 |
| EP | 3862517 | 8/2021 |
| KR | 101878462 | 7/2018 |
| KR | 101968278 | 4/2019 |
| WO | 2006110958 | 10/2006 |
| WO | 2011103844 | 9/2011 |
| WO | 2011109573 | 9/2011 |
| WO | 201250349 | 4/2012 |
| WO | 2012126039 | 9/2012 |
| WO | 2015189391 | 12/2015 |
| WO | 201926301 | 2/2016 |
| WO | 201814414 | 1/2018 |
| WO | 201918901 | 1/2019 |
| WO | 201971307 | 4/2019 |
| WO | 202048030 | 3/2020 |

* cited by examiner

ELECTRONIC LOCK WITH MORTISE INSERT

CROSS-REFERENCE TO RELATED APPLICATION

This application claims the benefit of U.S. Provisional Application Ser. No. 63/291,131, filed Dec. 17, 2021, the disclosure of which is hereby incorporated by reference in its entirety.

TECHNICAL FIELD

This invention relates to the field of electronic locks. More particularly, the invention relates to an electronic lock with a mortise insert.

BACKGROUND

Electronic locks are increasingly used in a wide variety of residential and commercial contexts. In typical residential installations, an electronic lock may include an exterior assembly, an interior assembly, and a latch assembly. The electronic lock will receive an authentication signal from a user, for example, in the form of an electronic code or wireless communication. Based on the authentication signal, the electronic lock may permit entry, for example, by actuating a deadbolt between an extended position and a retracted position (or, for example, allowing a user to initiate movement of the deadbolt).

In typical installations, electronic locks are installed in a retrofit configuration at a door location that has a borehole through the door between an exterior side and an interior side of the door, as well as a latch bore extending transversely from the borehole toward the door frame, through which the deadbolt extends. In such configurations, all of the circuitry and mechanical drive mechanisms used to implement the electronic lock must be located within one of the exterior assembly or the interior assembly. This includes, for example, a motor, batteries, processing circuitry, and any sensors that may be required.

In some more recent implementations of electronic locks, some componentry may be located within the borehole through the door. Such configurations allow for increased compactness of the electronic lock, however, placement of significant circuitry or mechanical componentry within the borehole provides difficulties, since there is a limited amount of space available within the borehole. Still further, when various circuitry is included within the borehole, access may be difficult, because one or both of the exterior assembly or interior assembly must be removed to access such circuitry.

Accordingly, improvements in configurations of electronic locks are desired.

SUMMARY

In general, the present disclosure relates to an electronic lock with a mortise insert. In example embodiments, a mortise may be provided in the door at which the electronic lock is installed, which allows for installation of some portion of the circuitry used by the electronic lock. In some cases, a mortise receives a battery assembly which may be usable to provide electrical power to processing circuitry and a motor used for extension or retraction of a deadbolt within an electronic lock.

In a first aspect, an electronic lock is disclosed that is installable at a door having an exterior side, an interior side, and an edge, the door having a mortise extending into the door from the edge and a borehole extending through the door from the interior side to the exterior side. The electronic lock includes an exterior assembly mountable to the exterior side of the door at the borehole, and an interior assembly mountable to the interior side of the door at the borehole. The electronic lock also includes a latch positionable at least partially within the borehole and having a deadbolt movable between an extended position and a retracted position, wherein in the extended position, the deadbolt extends from the edge of the door, and in the retracted position, the deadbolt retracts at least partially into the door. The electronic lock includes a motor operatively connected to the latch to actuate the latch between the extended position and the retracted position, and a control circuit operatively connected to the motor and configured to selectively actuate the motor to move the deadbolt between the retracted position and the extended position. The electronic lock includes a mortise insert mountable within the mortise, the mortise insert including a battery subassembly electrically connected to the control circuit.

In a second aspect, an electronic lock is disclosed that includes an exterior assembly mounted to an exterior side of a door at a borehole extending through the door from an interior side to the exterior side, and an interior assembly mounted to an interior side of the door at the borehole. The electronic lock includes a latch positioned at least partially within the borehole and having a deadbolt movable between an extended position and a retracted position, wherein, in the extended position, the deadbolt extends from the edge of the door, and in the retracted position, the deadbolt retracts into the door. The electronic lock includes a motor operatively connected to the latch to actuate the latch between the extended position and the retracted position, and a control circuit operatively connected to the motor and configured to selectively actuate the motor to move the deadbolt between the retracted position and the extended position. The electronic lock includes a mortise insert mounted within a mortise extending into the door from the edge, the mortise insert including a battery subassembly electrically connected to the control circuit.

In a third aspect, an electronic lock assembly includes an exterior assembly, an interior assembly, and a latch having a deadbolt movable between an extended position and a retracted position, the latch being movable in response to rotation of a torque blade. The electronic lock assembly includes a motor included within the interior assembly and operable to rotate the torque blade, and a control circuit operatively connected to the motor and configured to selectively actuate the motor. The electronic lock includes a mortise insert including a battery subassembly electrically connectable to the control circuit.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
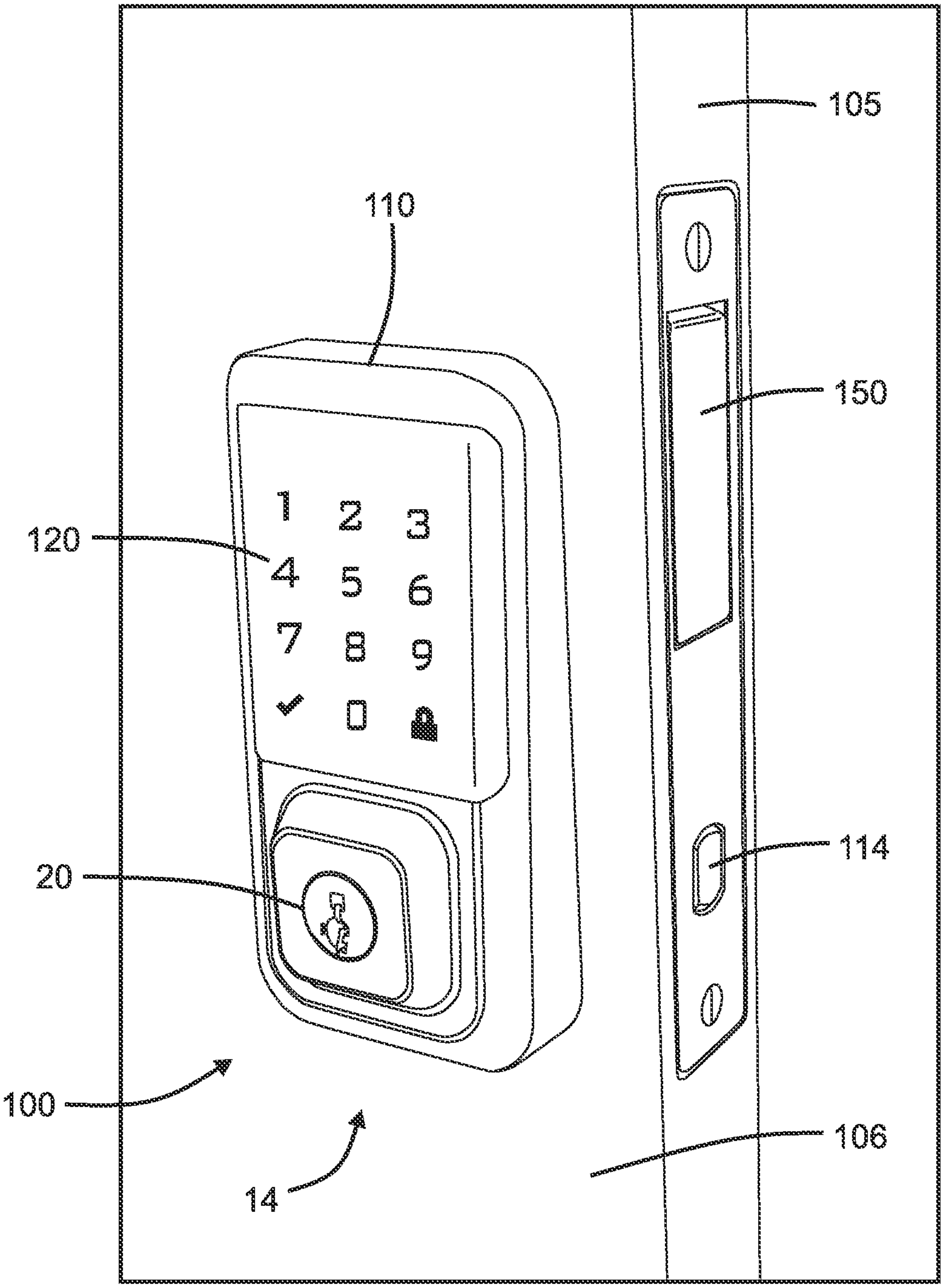
FIG. 1 illustrates an exterior side perspective view of an electronic lock with a mortise insert installed on a door, according to an example embodiment.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

As briefly described above, embodiments of the present invention are directed to an electronic lock with a mortise insert. In example embodiments, a mortise may be provided in the door at which the electronic lock is installed, which allows for installation of some portion of the circuitry used by the electronic lock. In some cases, a mortise receives a mortise insert. The mortise insert may include a battery assembly which may be usable to provide electrical power to processing circuitry and a motor used for extension or retraction of a deadbolt within an electronic lock. By providing the battery assembly within a mortise insert, the battery assembly may be accessible to individuals when a door is in an open position (e.g., and is therefore unlocked), to allow individuals access to the battery assembly. Accordingly, individuals having appropriate access rights to actuate the electronic lock (e.g., those who have access to an interior of a structure on which the electronic lock is provided) will have the ability to access and replace batteries within the battery assembly as needed. This improves accessibility of the battery assembly, while reducing overall size of either an interior assembly or an exterior assembly of an electronic lock. Accordingly, lower profile electronic lock installations may be designed.

In some example aspects, the battery assembly within the mortise is electrically connected to circuitry within one or both of the interior assembly and exterior assembly of the electronic lock. For example a battery assembly may provide power to a programmable circuit which controls operation of the electronic lock, as well as a motor that actuates a deadbolt. Power may be provided to one or more wired or wireless communication interfaces, as well as to external credential input or receipt mechanisms (e.g., a keypad). The programmable circuit, also referred to herein as a control circuit, may be located within the mortise insert itself, and may be included within an installed portion of the mortise insert, with the battery assembly being removable therefrom for battery replacement.

In some aspects, the mortise receives additional circuitry, beyond the battery assembly. For example, the mortise may receive portions of electronic lock circuitry or mechanical components for which accessibility is desired. Still further, the additional circuitry or mechanical components may be placed within some combination of the mortise and a borehole extending between an interior and an exterior of the door, thereby avoiding a requirement that such components be included within the interior or exterior assemblies, and improving compactness of the overall assembly at the interior and exterior sides of a door when installed.

Referring first to FIGS. 1-4, aspects of an exterior side of an electronic lock 100 are shown. In the example illustrated, the electronic lock 100 is mounted on a door 14 having an interior side 104 and exterior side 106. The electronic lock 100 has an interior assembly 108 mounted to the interior side 104 of the door 14, and an exterior assembly 110 mounted to the exterior side 106 of the door 14. A latch assembly 112 is positioned within a bore 16 (also referred to herein as a borehole) of the door 14, and includes a bolt 114, such as a deadbolt, which is movable between locked (extended) and unlocked (retracted) positions. The term "outside" or "exterior side" is broadly used to mean an area outside the door 14 and "inside" is broadly used to denote an area inside the door 14. With an exterior entry door, for example, the exterior assembly 110 may be mounted outside a building, while the interior assembly 108 may be mounted inside a building. With an interior door, the exterior assembly 110 may be mounted inside a building, but outside a room secured by the electronic lock 100, and the interior assembly 108 may be mounted inside the secured room. The electronic lock 100 is applicable to both interior and exterior doors.

The exterior assembly 110, in the embodiment shown, includes a keypad 120. The keypad can receive a code, such as a PIN code, which is preprogrammed within the electronic lock 100. In response to receipt of a valid code, in some embodiments, the electronic lock 100 may actuate, via a motor (discussed below), the latch assembly 112 to move the bolt 114 between extended and retracted positions. Although many embodiments disclosed describe the user of a keypad, alternative embodiments can use different types of user interfaces for receiving a credential to access the electronic lock. Example user interfaces include, but are not limited to, a touchscreen, biometric sensor (e.g., finger print scanner, camera configured with facial recognition authentication), access card reader, NFC reader, RFID reader, etc. Some embodiments include combinations of user interfaces for receiving credentials.

Additionally, the exterior assembly 110 includes a lock core 20 including a mechanical keyway. The lock core 20 may be mechanically attached to the latch assembly 112, such that a valid key turned within the lock core 20 may rotate a torque blade, which is engaged with the latch assembly 112 to move the bolt 114 between extended and retracted positions. In example embodiments, the lock core 20 can include a rekeyable lock core engageable to a latch assembly 112 in the manner shown in U.S. Pat. No. 10,612,271, entitled "Rekeyable Lock Cylinder With Enhanced Torque Resistance", and U.S. Patent Pub. No. 2020/0040605, entitled "Rekeyable Lock with Small Increments", the disclosures of each of which are hereby incorporated by reference in their entireties.

In the example shown, the electronic lock 100 can include one or more wireless interfaces configured to communicate with, e.g., a home network and/or a mobile device of a user. In example embodiments, the electronic lock 100 is configured to establish a secure communication connection via the one or more wireless interfaces to, for example, receive access codes and actuate a motor to actuate the latch assembly 112, change access codes, update a user account associated with the electronic lock, and adjust control settings of the electronic lock.

In particular, in the example shown, the electronic lock 100 includes a mortise insert 150 installable within a mortise 30 in an edge 105 of the door 14. In the example shown, the mortise 30 comprises a recess formed in the edge of the door that is positioned above the bore 16; however, in alternative embodiments, the mortise 30 may be located below the bore 16, or at least partially in vertical alignment with the bore (generally offset above or below the bolt 114). In general, the mortise 30 is separately formed from the bore 16 and may or may not form a joined cavity in cooperation with the bore. Additionally, the mortise 30 is generally separate from and spaced apart from a latch bore extending from the edge 105 of the door into the bore 16.

Figure 2:
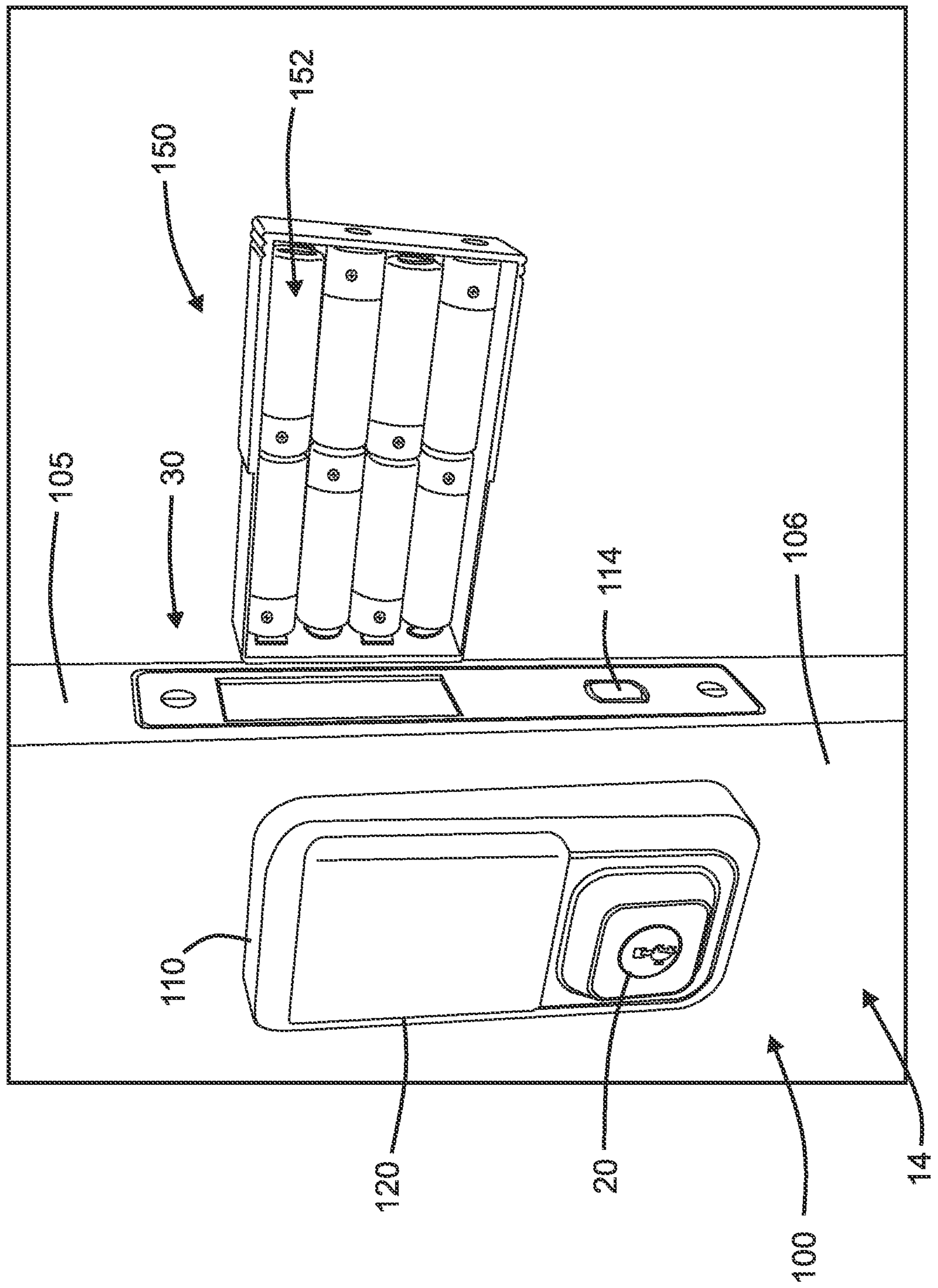
FIG. 2 illustrates the exterior side perspective view of the electronic lock of FIG. 1, with the mortise insert removed.

As seen in FIG. 2, the mortise insert 150 includes a battery assembly 152 that is insertable and removable from the edge 105 of the door 14. The mortised cavity in the door is configured to accept the mortise insert 150. In some embodiments the mortise insert includes the battery assembly 152. Alternatively, other power sources can be used. Examples of power sources include a rechargeable battery (such as lithium ion battery), one or more replaceable alkaline batteries, one or more photovoltaic cells electrically connected to a rechargeable battery, etc. As further discussed below, the battery assembly 152 is electrically connected to the interior assembly 108 and exterior assembly 110, to provide power to electronic components therein. In some alternative embodiments (examples of which are discussed in further detail below), additional components of the electronic lock 100 may be located within the mortise 30.

Figure 3:
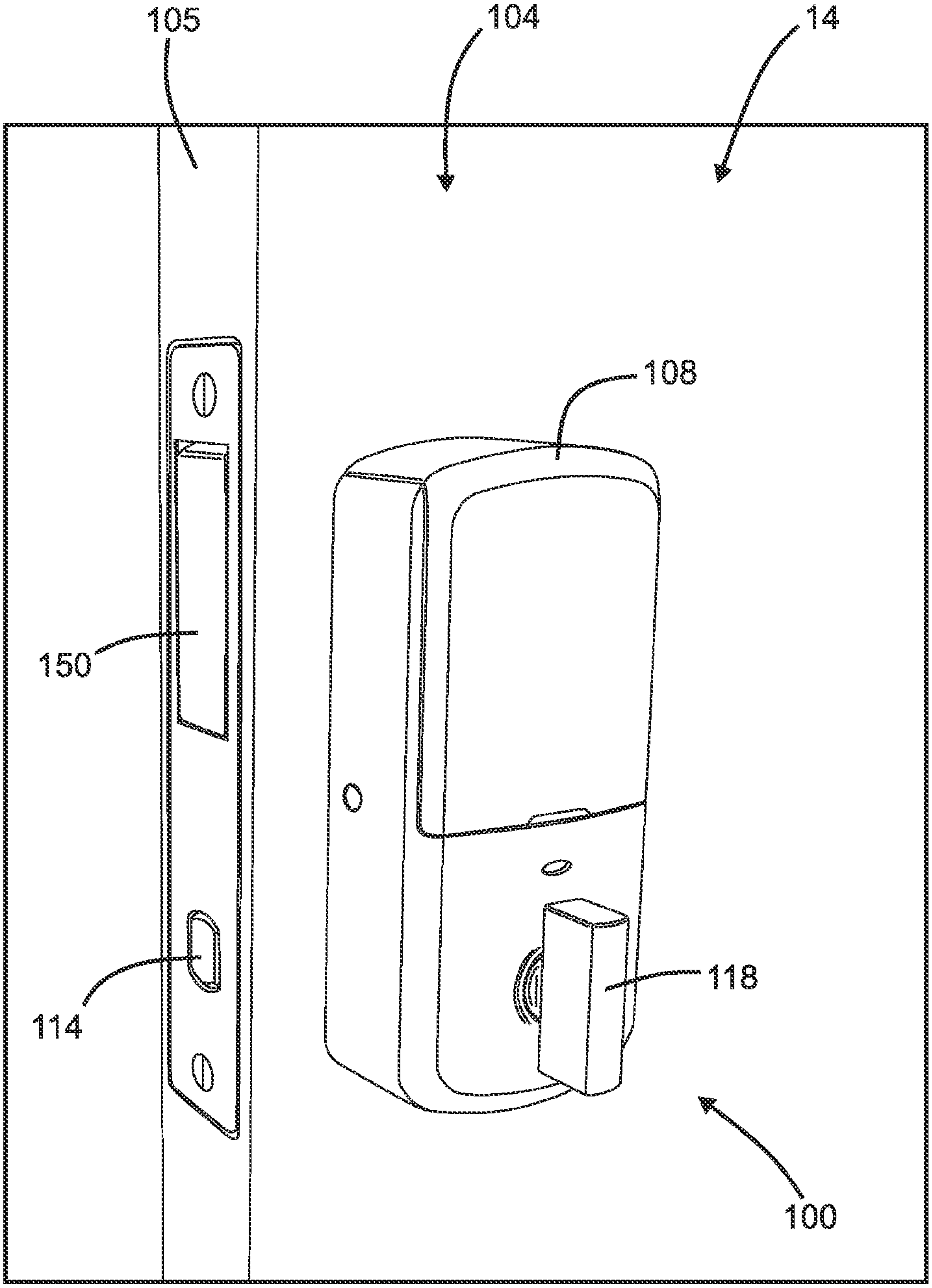
FIG. 3 illustrates an interior side perspective view of the electronic lock with the mortise insert of FIG. 1, with the mortise insert installed into a mortised cavity according to an example embodiment.

FIG. 3 illustrates an interior side perspective view of the electronic lock 100 of FIG. 1, according to an example embodiment. As seen in FIG. 3, the electronic lock 100 includes, within the interior assembly 108, control electronics for operating the electronic lock 100. For example, the interior assembly 108 may include a control circuit, a motor for actuating a latch assembly, and one or more sensors or communication interfaces. Details regarding an example of such control circuitry are provided below in connection with FIG. 4. The interior assembly 108 further includes, in the example shown, a manual turnpiece 118 that can be used on the interior side 104 of door 14 to move the bolt 114 between the extended and retracted positions. In general, the manual turnpiece 118 is maintained in operable connection with a torque blade (not shown) that is rotatable to actuate latch assembly 112 to move the bolt 114 between the extended and retracted positions.

Figure 4:
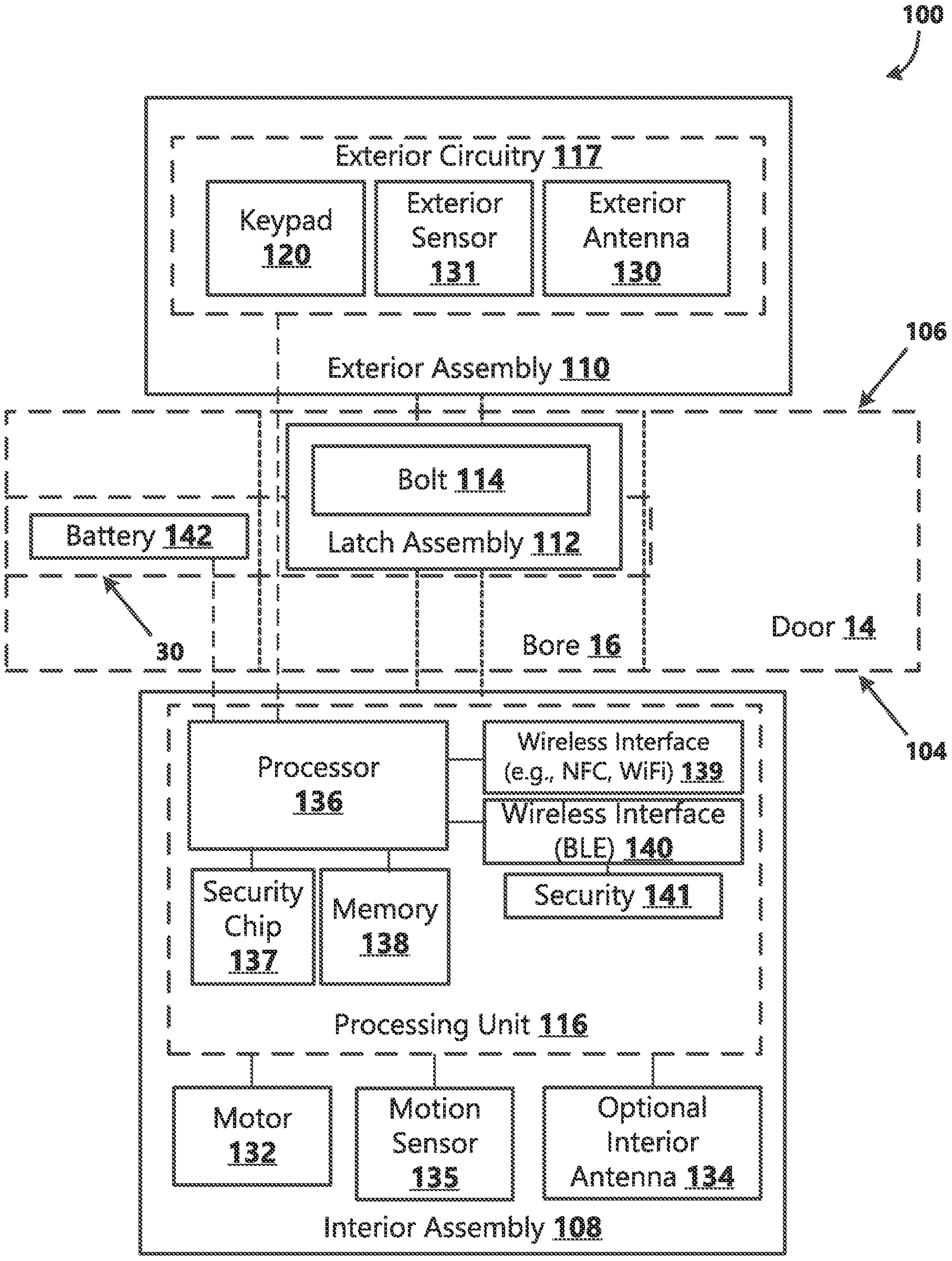
FIG. 4 illustrates an example block diagram of circuitry included within an electronic lock, according to an example embodiment.

FIG. 4 illustrates an example block diagram of circuitry included within an electronic lock 100, according to an example embodiment. The interior assembly 108 can include a processing unit 116 (shown schematically) containing electronic circuitry for the electronic lock 100. In some examples, the interior assembly 108 includes a manual turnpiece 118 (seen in FIG. 3 that can be used on the interior side 104 of door 14 to move the bolt 114 between the extended and retracted positions). The processing unit 116 is operable to execute a plurality of software instructions (i.e., firmware) that, when executed by the processing unit 116, cause the electronic lock 100 to implement the methods and otherwise operate and have functionality as described herein. The processing unit 116 may comprise a device commonly referred to as a processor, e.g., a central processing unit (CPU), digital signal processor (DSP), or other similar device, and may be embodied as a standalone unit or as a device shared with components of the electronic lock 100. The processing unit 116 may include memory communicatively interfaced to the processor, for storing the software instructions. Alternatively, the electronic lock 100 may further comprise a separate memory device for storing the software instructions that is electrically connected to the processing unit 116 for the bi-directional communication of the instructions, data, and signals therebetween.

The exterior assembly 110 is shown to include exterior circuitry 117, including the keypad 120 and an optional exterior antenna 130 usable for communication with a remote device. In addition, the exterior circuitry 117 of exterior assembly 110 can include one or more sensors 131, such as a camera, proximity sensor, or other mechanism by which conditions exterior to the door 14 can be sensed. In response to such sensed conditions, notifications may be sent by the electronic lock 100 to a server, admin mobile device, or guest mobile device, including information associated with a sensed event (e.g., time and description of the sensed event, or remote feed of sensor data obtained via the sensor).

The exterior antenna 130 is capable of being used in conjunction with an interior antenna 134, such that the processing unit 116 can determine where a mobile device is located. Only a mobile device (e.g., an admin mobile device or guest mobile device) that is paired with the electronic lock 100 and determined to be located on the exterior of the door 14 is able to actuate (unlock or lock) the door. This prevents unauthorized users from being located exterior to the door 14 of the electronic lock 100 and taking advantage of an authorized mobile device that may be located on the interior of the door, even though that authorized mobile device is not being used to actuate the door. However, such a feature is not required, but can add additional security. In alternative arrangements, the electronic lock 100 is only actuable from either the keypad 120 (via entry of a valid actuation passcode) or from an application installed on the mobile device. In such arrangements, because touch alone at the exterior of the door 14 cannot actuate the lock, the exterior antenna 130 may be excluded entirely.

As described above, the interior assembly 108 includes the processing unit 116. The interior assembly 108 can also include a motor 132 and an optional interior antenna 134.

As shown, the processing unit 116 includes at least one processor 136 communicatively connected to a security chip 137, a memory 138, various wireless communication interfaces (e.g., including a Wi-Fi interface 139 and/or a Bluetooth interface 140), and a battery 142. The processing unit 116 is located within the interior assembly 108 and is capable of operating the electronic lock 100, e.g., by actuating the motor 132 to actuate the bolt 114 (e.g., by rotating the torque blade described above).

In some examples, the processor 136 can process signals received from a variety of devices to determine whether the electronic lock 100 should be actuated. Such processing can be based on a set of preprogramed instructions (i.e., firmware) stored in the memory 138. In certain embodiments, the processing unit 116 can include a plurality of processors 136, including one or more general purpose or specific purpose instruction processors. In some examples, the processing unit 116 is configured to capture a keypad input event from a user and store the keypad input event in the memory 138. In other examples, the processor 136 receives a signal from the exterior antenna 130, the interior antenna 134, or a motion sensor 135 (e.g., a vibration sensor, gyroscope, accelerometer, motion/position sensor, or combination thereof) and can validate received signals in order to actuate the electronic lock 100. In still other examples, the processor 136 receives signals from the Bluetooth interface 140 to determine whether to actuate the electronic lock 100.

In some embodiments, the processing unit 116 includes a security chip 137 that is communicatively interconnected with one or more instances of processor 136. The security chip 137 can, for example, generate and store cryptographic information usable to generate a certificate usable to validate the electronic lock 100 with a remote system, such as a server or mobile device. In certain embodiments, the security chip 137 includes a one-time write function in which a portion of memory of the security chip 137 can be written only once, and then locked. Such memory can be used, for example, to store cryptographic information derived from characteristics of the electronic lock 100, or its communication channels with a server or one or more mobile devices. Accordingly, once written, such cryptographic information can be used in a certificate generation process which ensures that, if any of the characteristics reflected in the cryptographic information are changed, the certificate that is generated by the security chip 137 would become invalid, and thereby render the electronic lock 100 unable to perform various functions, such as communicate with a server or mobile device, or operate at all, in some cases.

In some embodiments, the security chip 137 may be configured to generate a pairing passcode that, when entered using the keypad 120 of the electronic lock 100, triggers a BLE pairing mode of the electronic lock 100 that enables the electronic lock 100 to pair with a proximate mobile device (e.g., a mobile device on which an electronic lock application associated with the electronic lock 100 is operating). In some examples, the pairing passcode is provided to an administrative user upon initial setup/activation of the electronic lock 100 (e.g., via an electronic lock application associated with the electronic lock 100 operating on a mobile device). In some examples, the pairing passcode is a random value. In some examples, the administrative user may be enabled to change the pairing passcode by setting their own code or by requesting a random value to be generated by the electronic lock application operating on a mobile device. In some examples, the length of the pairing passcode is variable. According to an aspect, for increased security, the pairing passcode may be a limited-use passcode. For example, the pairing passcode may be limited to a single use or may be active for a preset or administrative user-selected time duration. In further examples, a digit of the pairing passcode may correspond to a setting that may instruct the electronic lock 100 to perform one or more of: disable the pairing passcode after it has been used; keep the pairing passcode enabled after it has been used; or reset the pairing passcode to a new random value after it has been used.

The memory 138 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically erasable programmable ROM, and other types of devices and/or articles of manufacture that store data. Computer storage media generally includes at least one or more tangible media or devices. Computer storage media can, in some examples, include embodiments including entirely non-transitory components.

As noted above, the processing unit 116 can include one or more wireless interfaces, such as Wi-Fi interface 139 and/or a Bluetooth interface 140. Other RF circuits can be included as well. In the example shown, the interfaces 139, 140 are capable of communication using at least one wireless communication protocol. In some examples, the processing unit 116 can communicate with a remote device via the Wi-Fi interface 139, or a local device via the Bluetooth interface 140. In some examples, the processing unit 116 can communicate with one or more mobile devices and/or a server via the Wi-Fi interface, and can communicate with a mobile device when the mobile device is in proximity to the electronic lock 100 via the Bluetooth interface 140. In some embodiments, the processing unit 116 is configured to communicate with a mobile device via the Bluetooth interface 140, and communications between the mobile device and electronic lock 100 when the mobile device is out of range of Bluetooth wireless signals can be relayed via a server, e.g., via the Wi-Fi interface 139.

The Bluetooth interface 140 is an example of a short range wireless interface capable of communicating with devices using a short range wireless protocol. Although Bluetooth is the example interface and protocol shown, other protocols may be used as well, via one or more additional wireless interfaces. In some examples, the electronic lock 100 can wirelessly communicate with external devices through a desired wireless communications protocol. In some examples, an external device can wirelessly control the operation of the electronic lock 100, such as operation of the bolt 114. The electronic lock 100 can utilize wireless protocols including, but not limited to, the IEEE 802.11 standard (Wi-Fi®), the IEEE 802.15.4 standard (Zigbee® and Z-Wave®), the IEEE 802.15.1 standard (Bluetooth®), a cellular network, a wireless local area network, near-field communication protocol, and/or other network protocols. In some examples, the electronic lock 100 can wirelessly communicate with networked and/or distributed computing systems, such as may be present in a cloud-computing environment.

In a particular embodiment, the processor 136 will receive a signal at the Bluetooth interface 140 via a wireless communication protocol (e.g., BLE) from a mobile device for communication of an intent to actuate the electronic lock 100. As illustrated in further detail below, the processor 136 can also initiate communication with a server via Wi-Fi interface 139 (or another wireless interface) for purposes of validating an attempted actuation of the electronic lock 100, or receiving an actuation command to actuate the electronic lock 100. Additionally, various other settings can be viewed and/or modified via the Wi-Fi interface 139 from the server; as such, a user (e.g., administrative user or guest user) of a mobile device may access an account associated with the electronic lock 100 to view and modify settings of that lock, which are then propagated from a server to the electronic lock 100. In other examples, the processor 136 may communicate with a server via a connection through a mobile device, such as an authorized mobile device within range of a short range wireless connection. In alternative embodiments, other types of wireless interfaces can be used; generally, the wireless interface used for communication with a mobile device can operate using a different wireless protocol than a wireless interface used for communication with a server.

In a particular example, the Bluetooth interface 140 comprises a Bluetooth Low Energy (BLE) interface. Additionally, in some embodiments, the Bluetooth interface 140 is associated with a security chip 141, for example, a cryptographic circuit capable of storing cryptographic information and generating encryption keys usable to generate certificates for communication with other systems, e.g., mobile devices. As described further below, the electronic lock 100 may exchange certificates with a mobile device as part of a mutual authentication process used to establish a non-paired, secured connection between the electronic lock and a mobile device. Furthermore, as described previously, the Bluetooth interface 140 may have a finite number of storage locations for bonded device key information. The non-paired, secured connection allows for keys to be exchanged which are not required to be stored in the finite storage locations of the Bluetooth interface 140.

In the example shown, the interior assembly 108 also includes the motor 132 that is capable of actuating the bolt 114. In use, the motor 132 receives an actuation command from the processing unit 116, which causes the motor 132 to actuate the bolt 114 from the locked position to the unlocked position or from the unlocked position to the locked position. In some examples, the motor 132 actuates the bolt 114 to an opposing state. In some examples, the motor 132 receives a specified lock or unlock command, where the motor 132 only actuates the bolt 114 if the bolt 114 is in the correct position. For example, if the door 14 is locked and the motor 132 receives a lock command, then no action is taken. If the door 14 is locked and the motor 132 receives an unlock command, then the motor 132 actuates the bolt 114 to unlock the door 14.

As noted above, the optional interior antenna 134 may also be located in the interior assembly 108. In some examples, the interior antenna 134 is capable of operating together with the exterior antenna 130 to determine the location of a mobile device in proximity to the electronic lock 100. In some examples, only a mobile device determined to be located on the exterior side 106 of the door 14 is able to unlock (or lock) the door 14. This prevents unauthorized users from being located near the electronic lock 100 and taking advantage of an authorized mobile device that may be located on the interior side 104 of the door 14, even though the authorized mobile device is not being used to unlock the door 14. In alternative embodiments, the interior antenna 134 can be excluded entirely, since the electronic lock 100 is actuated only by an authorized mobile device.

In this example, a mortise insert 150 includes a battery subassembly 152 (also referred to herein as simply a battery) to power the electronic lock 100. In one example, the battery 142 may include one or more standard single-use (disposable) batteries. Alternatively, the battery 142 may be rechargeable. In still further embodiments, the battery 142 is optional altogether, replaced by an alternative power source (e.g., an AC power connection). In particular embodiments, the battery includes a plurality of replaceable, single-use batteries. Given the size of such an assembly, by moving the battery 142 into the mortise 30 within a mortise insert 150, the size of the interior assembly 108 may be significantly reduced.

Figure 8:
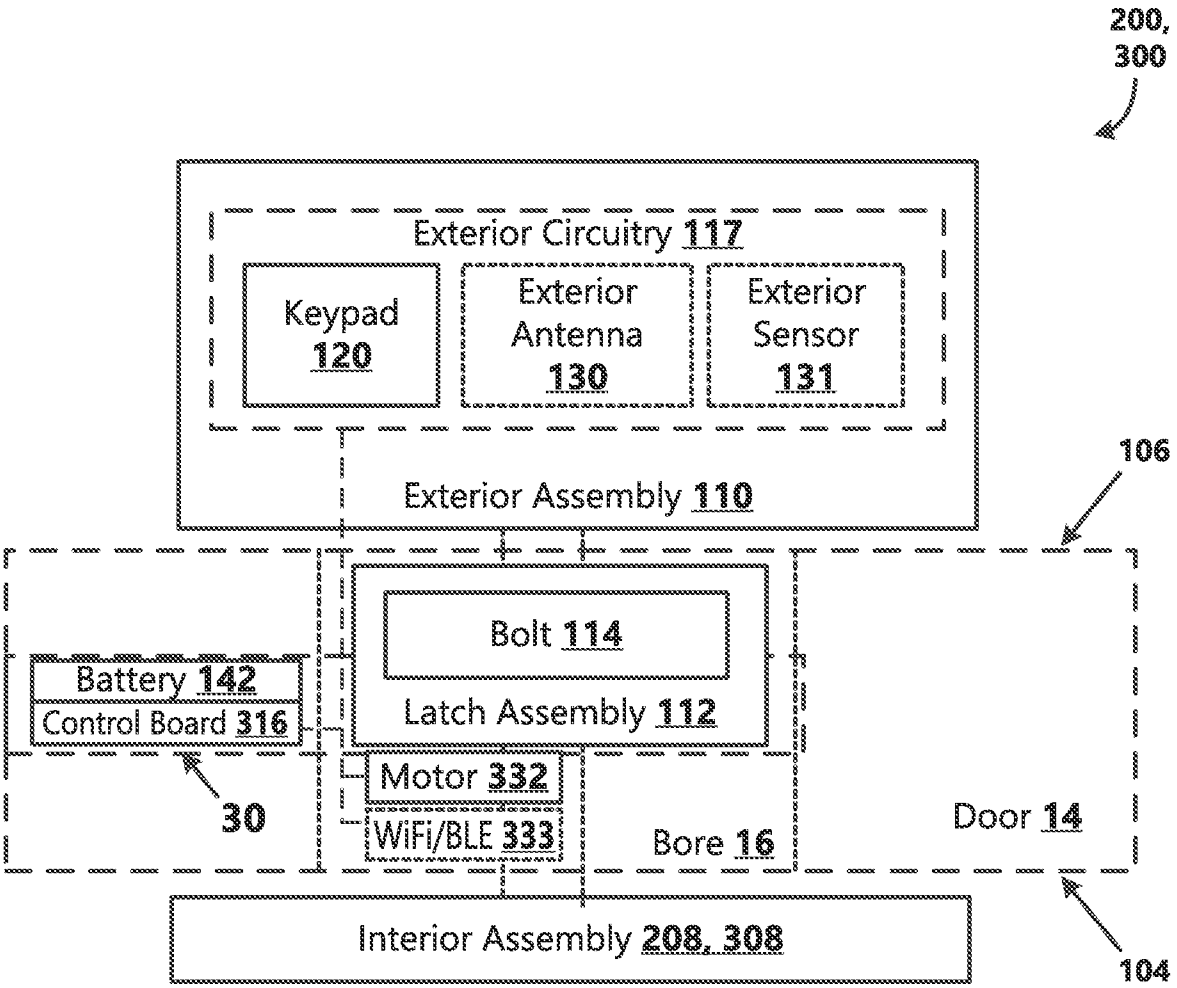
FIG. 8 illustrates a further example block diagram of circuitry included within an electronic lock, according to the second and/or third example embodiments.

In additional embodiments, one or more other electronic components may be located within the mortise insert 150. For example, processing unit 116 or other devices may be included within mortise insert 150, as seen in FIG. 8. In such examples, while the battery 142 may be removable and/or replaceable, the processing unit 116 may remain mounted within the mortise insert and stay within the mortise 30 when the battery 142 is removed/replaced.

Referring now to FIGS. 5-8, additional example embodiments of an electronic lock are shown. In these example embodiments, different components may be incorporated into the mortise and or borehole of the door to change an exterior appearance and/or functionality included within the interior assembly or exterior assembly of such a lock.

Figure 5:
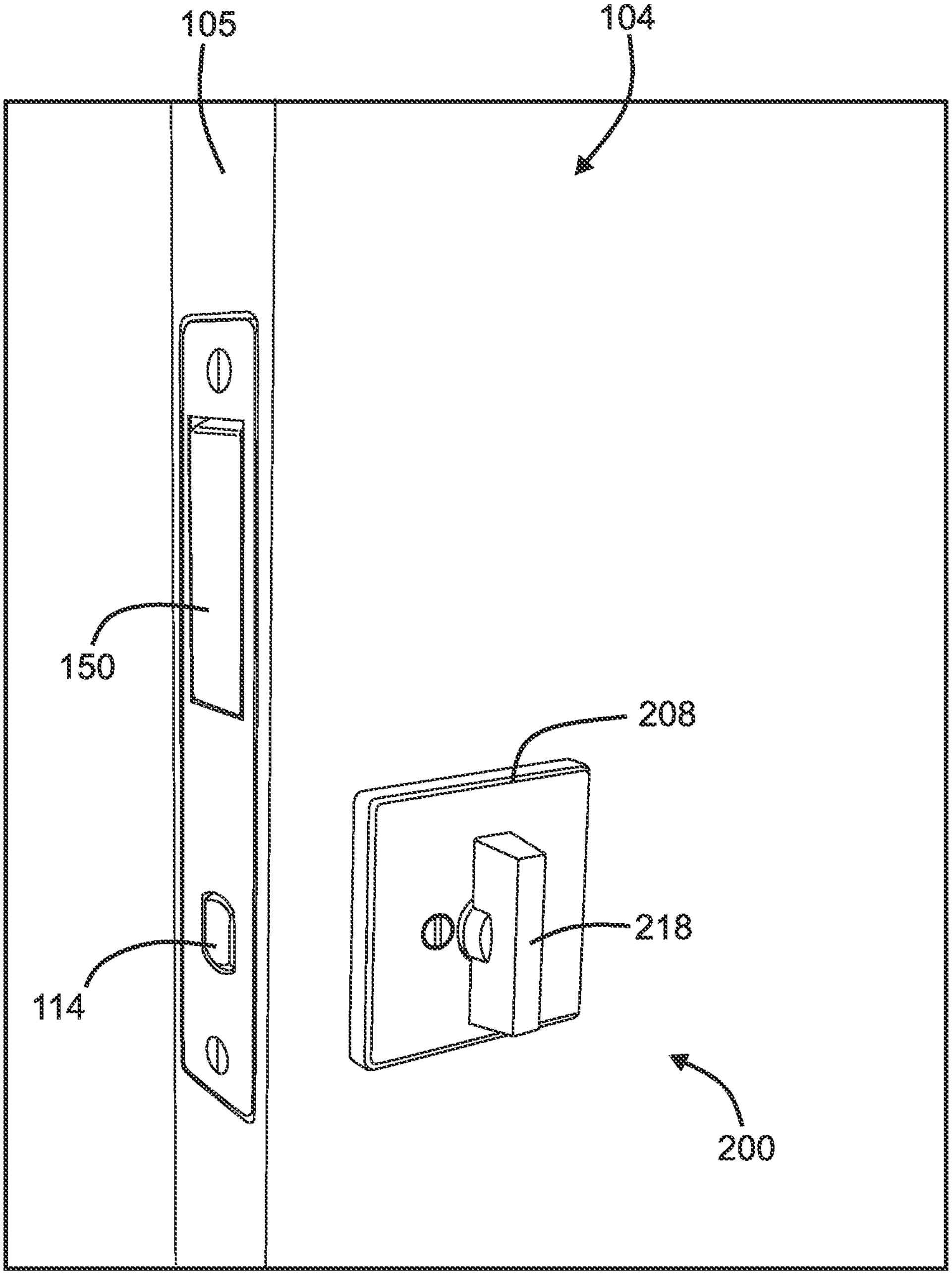
FIG. 5 illustrates an interior side perspective view of the electronic lock with the mortise insert of FIG. 1, according to a second example embodiment.

In the particular embodiment seen in FIG. 5, an electronic lock 200 that includes an interior assembly 208 is shown. The interior assembly 208 may be used in example embodiments in which electronic components are included within the mortise 30 and/or bore 16. The interior assembly 208 includes a manual turnpiece 218. As with manual turnpiece 118, the manual turnpiece 218 can be used on the interior side 104 of door 14 to move the bolt 114 between the extended and retracted positions. In general, the manual turnpiece 218 is maintained in operable connection with a torque blade (not shown) that is rotatable to actuate the latch assembly 112 (seen in FIG. 7) to move the bolt 114 between the extended and retracted positions. In example embodiments, the electronic lock 200 may correspond to a lock that does not include wireless communication capabilities for communication with a mobile device and/or server. Rather, the electronic lock 200 may, in some examples, be constructed for electronic actuation solely from keypad or a mobile device.

Figure 6:
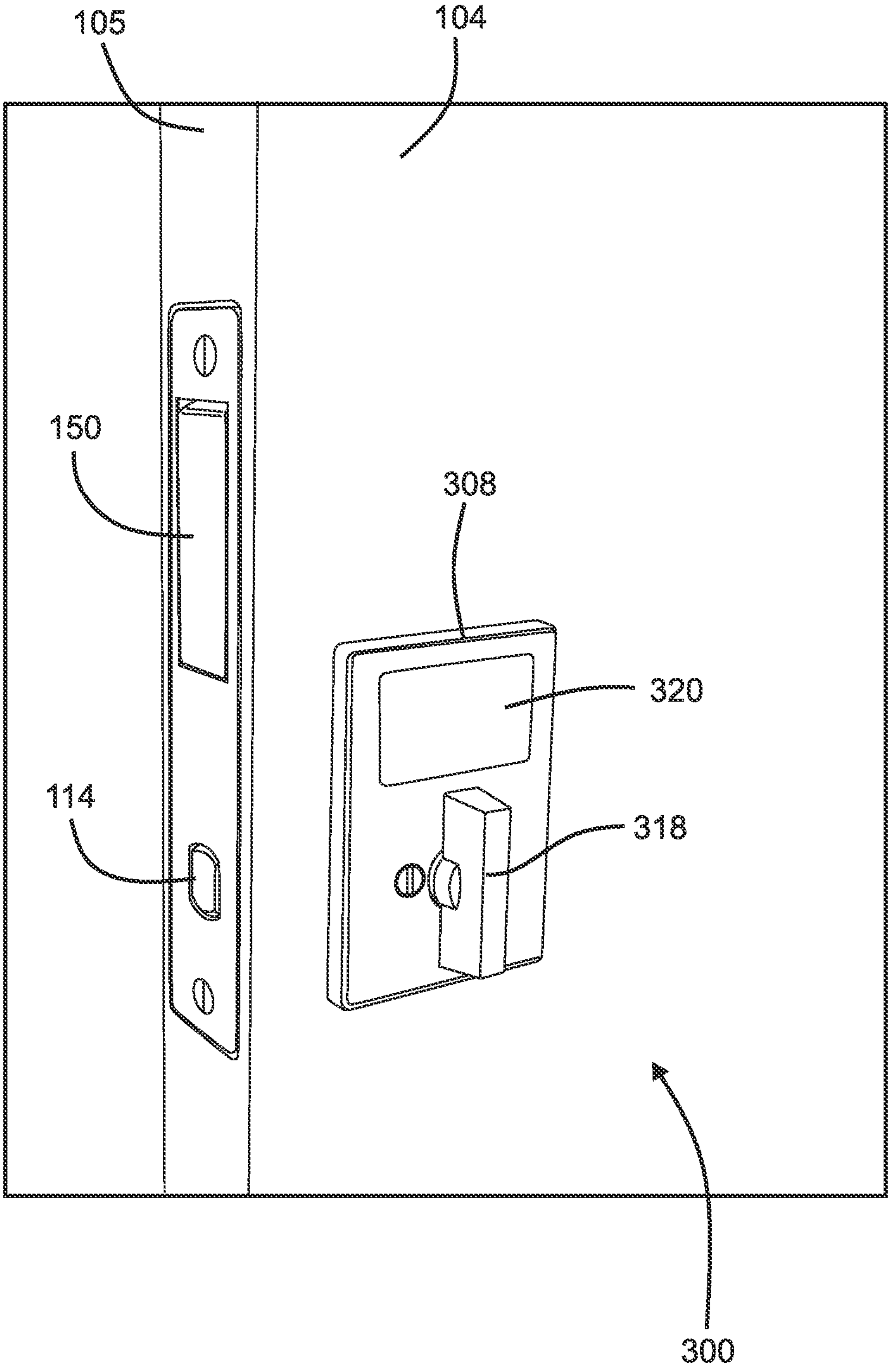
FIG. 6 illustrates an interior side perspective view of the electronic lock with the mortise insert of FIG. 1, according to a third example embodiment.

In the embodiment seen in FIG. 6, an electronic lock 300 is shown in which a further interior assembly 308 may be used. In such an arrangement, features of the electronic lock 300 may also be incorporated into the mortise and/or bore to maintain a low profile interior assembly, but may be used in example embodiments where electronic, wireless communication may be desired at the interior assembly of an electronic lock. In this example, the interior assembly 308 includes a manual turnpiece 318, as well as an RF-transparent window 320 usable to allow emission and receipt of wireless signals.

Figure 7:
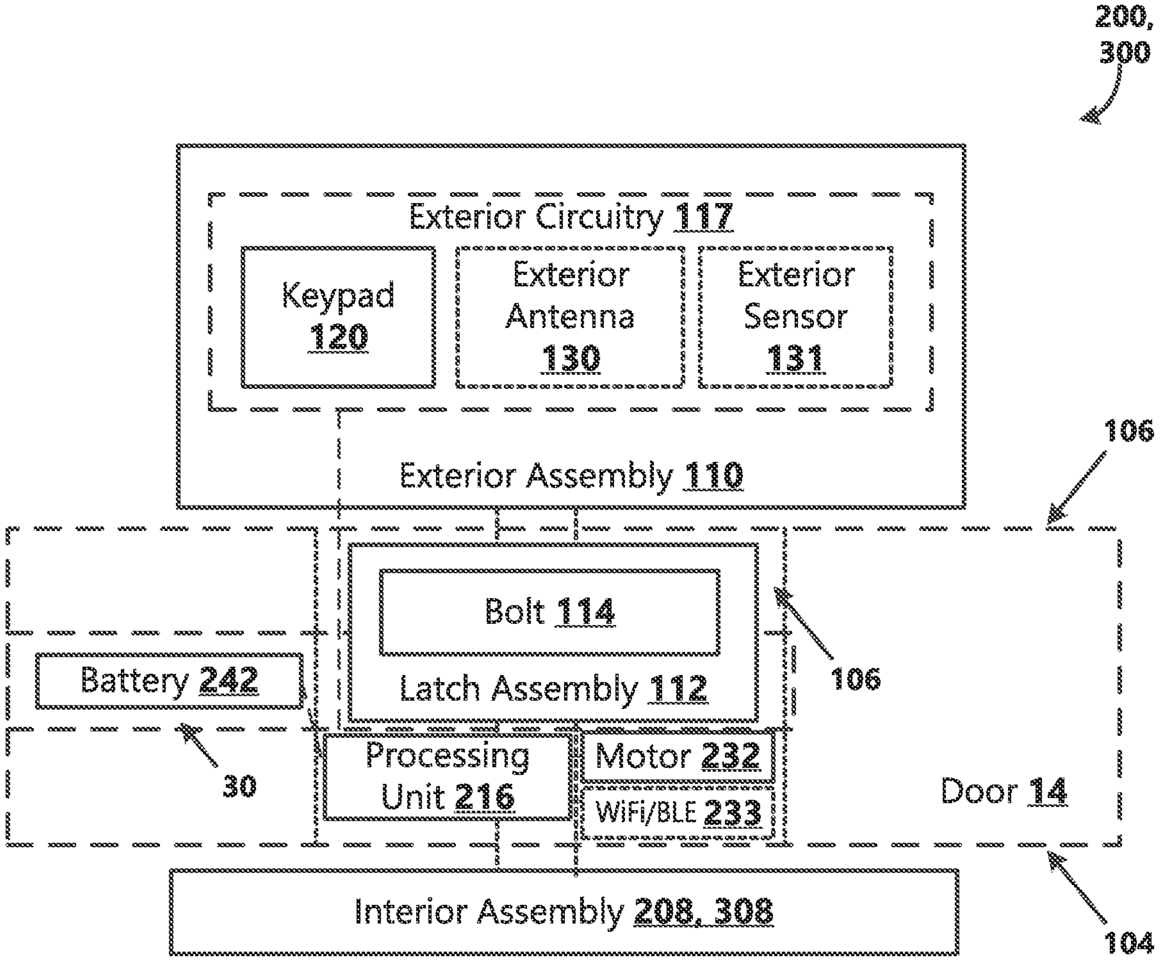
FIG. 7 illustrates an example block diagram of circuitry included within an electronic lock, according to the second and/or third example embodiments.

Referring to FIGS. 7-8, example block diagrams of circuitry usable within either of the electronic locks 200, 300 are shown. In the examples shown, like components to those discussed above in conjunction with FIG. 4 are numbered accordingly.

In the example seen in FIG. 7, the interior assembly 208, 308 lacks a processing unit 116, motor 132, motion sensor 135, and interior antenna 134, as seen in FIG. 4. Rather, a processing unit 216 and motor 232 are provided within the bore 16. Additionally, in an optional configuration such as where an electronic lock 300 includes wireless communication, a wireless interface 233 may also be provided within the bore 16.

In the example seen in FIG. 7, within the exterior assembly 110, the exterior antenna 130, and exterior sensor 131 may be optionally included, for example only in the case where used in an electronic lock 300 that provides wireless communication.

In the further configuration example seen in FIG. 8, a control board 316, including at least a control circuit, such as a processing unit, may be included within a mortise insert within a mortise 30. The control board 316 may include, for example, a processing unit, a memory, and optionally one or more wireless communication interfaces. When wireless communication is desirable to be included within a low-profile electronic lock (e.g., as in the example of electronic lock 300), depending on the transmissibility of the wireless protocol used, in some examples, a separate wireless communication interface, such as WiFi/BLE interface 333, may be provided within the bore 16. In some examples, additional circuitry may be maintained within the bore 16 and/or interior assembly 208, 308, depending on whether wireless communication is desired, since some such circuitry may be maintained in a compact manner. For example, the motion sensor, interior antenna, and/or other circuitry as described above may be included in the interior assembly 208, 308. However, for compactness, motor 332 is maintained within the bore 16 to directly interact with the latch assembly 112 to drive the bolt 114.

Figure 9:
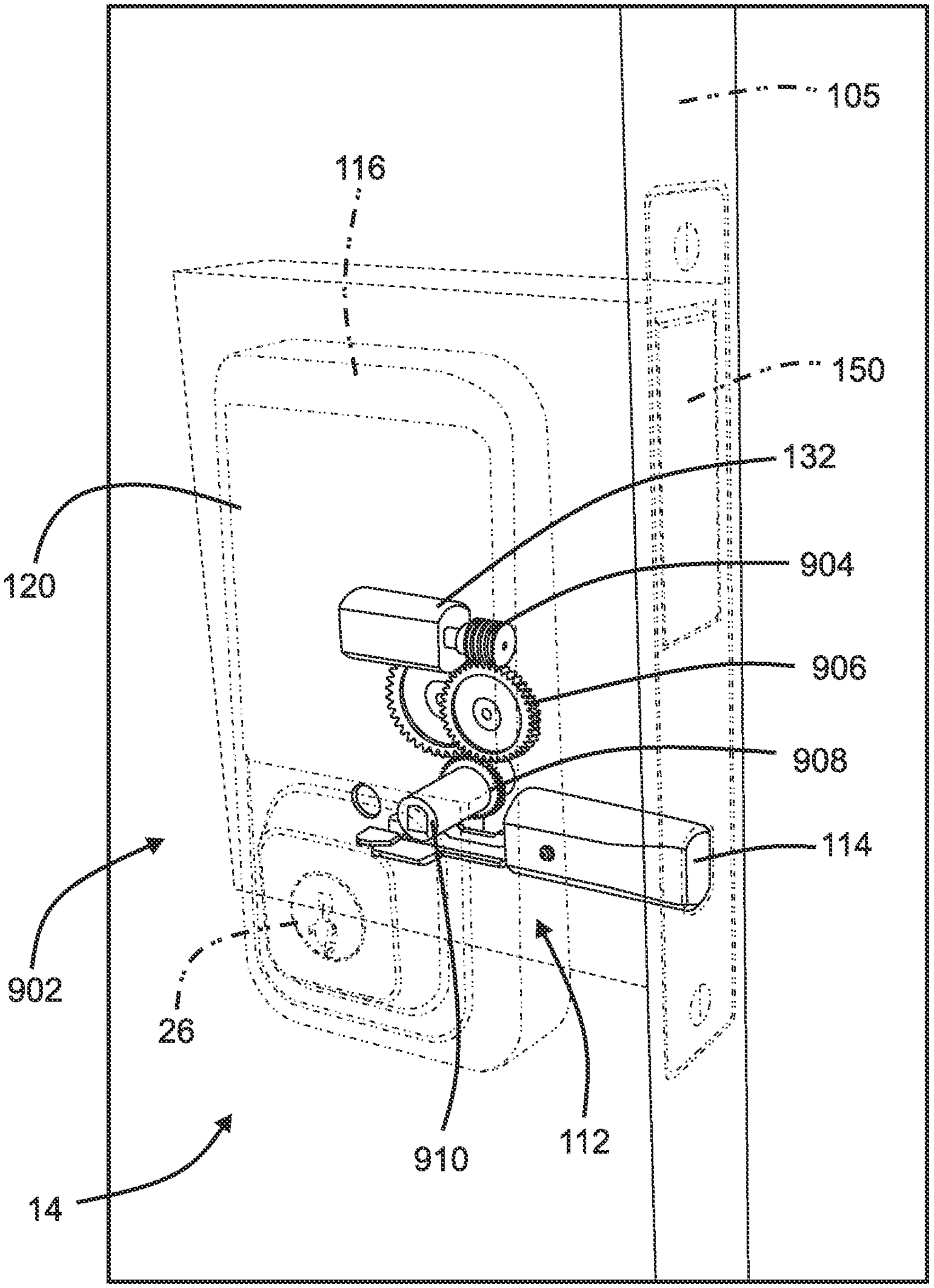
FIG. 9 illustrates a schematic semi-transparent view of the electronic lock according to example embodiments of FIGS. 1-8.

FIG. 9 illustrates a schematic semi-transparent view of the electronic lock according to example embodiments of FIGS. 1-8. In this example, a construction of a motor 132 (alternatively motors 232, 332) is shown as interacting with latch assembly 112 via a gear assembly 902. The gear assembly 902 includes a worm gear 904 that rotates an intermediate gear 906, which in turn rotates a torque blade gear 908. The torque blade gear 908 is in a fixed relationship to a torque blade 910, and therefore causes rotation of the torque blade to therefore actuate the latch assembly 112 between retracted and extended positions in response to actuation of the motor 132. One or more additional gears may be included within gear assembly 902 depending on the particular location, orientation, and configuration of motor 132, 232, 332 as described herein.

Figure 10:
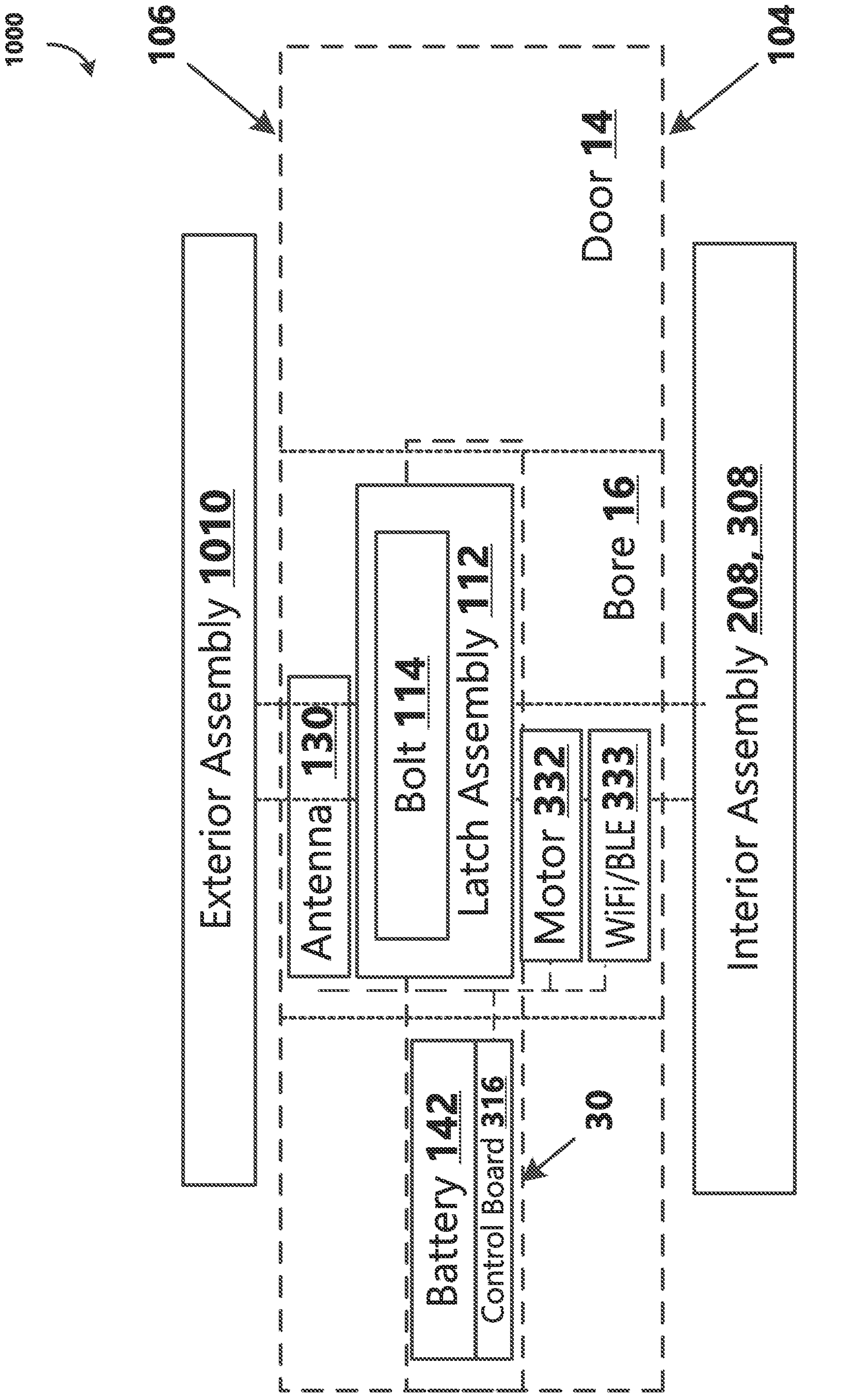
FIG. 10 illustrates a further example block diagram of circuitry included within an electronic lock, according to further example embodiments.

FIG. 10 illustrates a further example block diagram of circuitry 1000 included within an electronic lock, according to further example embodiments. In some embodiments, at least one of: (i) the motor 322; (ii) a driving mechanism (not shown); (iii) circuitry (e.g., the control board 316); (iv) a chassis (not shown); or any combination of (i), (ii), (iii), and (iv); are positioned at least partially within the cavity mortised into the door 14. In the example shown, the interior assembly 208, 308 also lacks a processing unit, motor, motion sensor, and interior assembly, as seen in FIG. 7. However, in this example, a motor 332 and wireless interface, shown as a WiFi/BLE interface 333, are positioned within the bore 16. The battery 142 and control board 316 may remain within an assembly installable within a mortise 30 in the door 14. Accordingly, only minimal electromechanical componentry is required to be included within the interior assembly 208, 308, as well as the exterior assembly 1010. That is, in this example the exterior assembly 1010 lacks any electronic equipment, and may simply include a keyway or other mechanical locking or unlocking mechanism.

Figure 11:
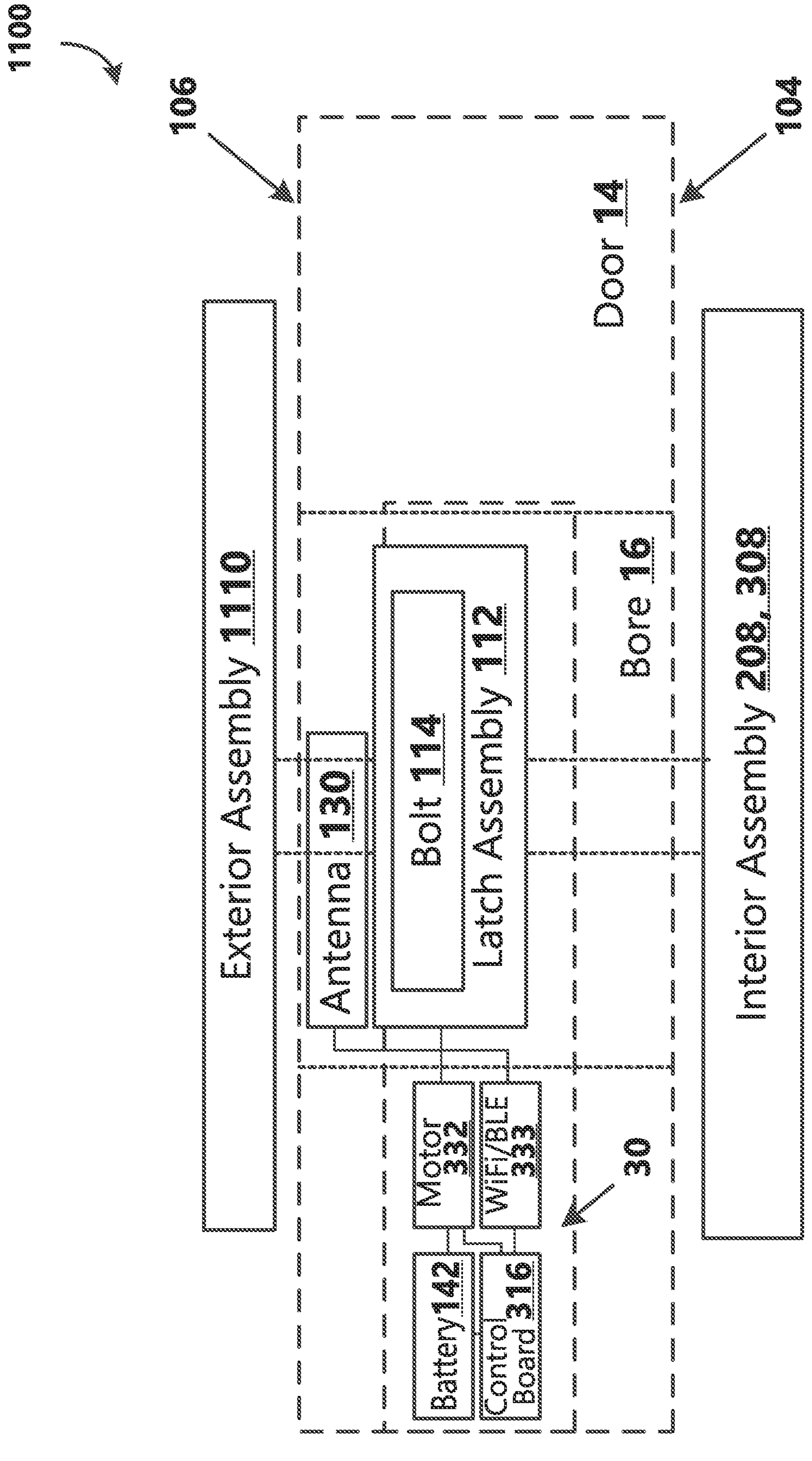
FIG. 11 illustrates a further example block diagram of circuitry included within an electronic lock, according to further example embodiments.

FIG. 11 illustrates a further example block diagram of circuitry 1100 included within an electronic lock, according to further example embodiments. In this example, a control board 316, motor 332, and WiFi/BLE interface 333 are included within a mortise 30. In the example shown, the exterior antenna 130 may be maintained within the bore 16. The motor 332 may be operatively connected to the latch assembly 112, since the mortise 30 extends to and meets the bore 16. As above, the battery 142 may also be maintained within the mortise 30. In this example, the exterior assembly 1110, as with exterior assembly 1010, lacks any electronic equipment, and may simply include a keyway or other mechanical locking or unlocking mechanism.

Referring to FIGS. 10-11 generally, although these implementations are shown as including no electromechanical components within interior or exterior assemblies, it is noted that other optional elements, such as a keypad (or other user interface configured to receive a pass code), or other electronic or mechanical components may be added to the interior or exterior assemblies in addition to placement of the battery, control board and memory, motor, and wireless interface within the bore and/or mortise.

In some embodiments, at least one of: (i) the motor 322; (ii) a driving mechanism; (iii) circuitry (e.g., the control board 316, WiFi/BLE interface 333, etc.); (iv) a chassis; or any combination of (i), (ii), (iii), and (iv); are positioned at least partially within the door 14. In some embodiments, any combination of (i), (ii), (iii), and (iv) maybe positioned inside the bore 16 of the door 14 and/or inside the mortise 30 of the door 14. In some embodiments, only decor trims (e.g., as part of the interior assembly 208, 308, and the exterior assembly 1010 (FIG. 10), 1110 (FIG. 11)) are interior and exterior of the door 14.

Additionally, and referring to FIGS. 1-11 overall, it is noted that the electronic locks of the present disclosure have a number of advantages over existing locks in terms of flexibility of configuration, as well as compactness of the interior and/or exterior assemblies while allowing use of standard battery packs.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. An electronic lock installable at a door having an exterior side, an interior side, and an edge, the door having a mortise extending into the door from the edge and a borehole extending through the door from the interior side to the exterior side, the electronic lock comprising:

an exterior assembly mountable to the exterior side of the door at the borehole;

an interior assembly mountable to the interior side of the door at the borehole;

a latch positionable at least partially within the borehole and at least partially within the mortise, the latch having a deadbolt movable between an extended position and a retracted position, wherein in the extended position, the deadbolt extends from the edge of the door, and in the retracted position, the deadbolt retracts at least partially into the door;

a motor operatively connected to the latch to actuate the deadbolt between the extended position and the retracted position;

a control circuit operatively connected to the motor and configured to selectively actuate the motor to move the deadbolt between the retracted position and the extended position; and a mortise insert mountable within the mortise, the mortise insert defining a housing, the mortise insert including a battery subassembly positioned within the housing, the battery subassembly electrically connected to the control circuit, the latch positioned at least partially within the housing, the battery subassembly being removable from the housing independent of the latch.

2. The electronic lock of claim 1, wherein the battery subassembly is removable from the mortise at the edge of the door.

3. The electronic lock of claim 1, wherein the mortise insert includes a mortise insert housing, and wherein the control circuit is positioned within the mortise insert housing, and wherein when the mortise insert is installed within the mortise, the control circuit and the mortise insert housing remain within the mortise when the battery subassembly is removed from the mortise.

4. The electronic lock of claim 1, wherein the exterior assembly includes a keypad, the keypad being configured to receive an authentication code.

5. The electronic lock of claim 4, wherein the control circuit is configured to, in response to receiving the authentication code from the keypad, actuate the motor to move the deadbolt from the extended position to the retracted position.

6. The electronic lock of claim 1, wherein the deadbolt extends through a cross bore extending into the door from the edge of the door to the borehole, and wherein the mortise is positioned at least partially above the cross bore.

7. The electronic lock of claim 1, wherein the motor is positioned at least partially within the borehole.

8. The electronic lock of claim 1, wherein the motor is positioned within the interior assembly.

9. The electronic lock of claim 8, wherein the control circuit is positioned within the interior assembly.

10. The electronic lock of claim 1, further comprising a wireless interface operatively connected to the control circuit.

11. The electronic lock of claim 1, further comprising a manual turnpiece included at the interior assembly.

12. An electronic lock comprising:

an exterior assembly mounted to an exterior side of a door at a borehole extending through the door from an interior side to the exterior side;

an interior assembly mounted to the interior side of the door at the borehole;

a latch positioned at least partially within the borehole and at least partially within a mortise, the latch having a deadbolt movable between an extended position and a retracted position, wherein, in the extended position, the deadbolt extends from an edge of the door, and in the retracted position, the deadbolt retracts at least partially into the door;

a motor operatively connected to the latch to actuate the latch between the extended position and the retracted position;

a control circuit operatively connected to the motor and configured to selectively actuate the motor to move the deadbolt between the retracted position and the extended position; and a mortise insert mounted within the mortise, the mortise insert defining a housing extending into the door from the edge, the mortise insert including a battery subassembly positioned within the housing, the battery subassembly electrically connected to the control circuit, the latch positioned at least partially within the housing, and the battery subassembly being removable from the housing independent of the latch.

13. The electronic lock of claim 12, further comprising a wireless communication interface operatively connected to the control circuit.

14. The electronic lock of claim 13, wherein the wireless communication interface comprises a Bluetooth interface.

15. The electronic lock of claim 12, wherein the exterior assembly includes a user interface configured to receive a credential.

16. The electronic lock of claim 12, wherein the control circuit is included within the mortise insert.

17. The electronic lock of claim 12, wherein the control circuit is included within the interior assembly.

18. The electronic lock of claim 12, wherein at least one of: (i) the motor, (ii) a driving mechanism, (iii) circuitry, (iv) a chassis, or any combination of (i), (ii), (iii), and (iv), are positioned at least partially within the door.

19. An electronic lock assembly comprising:

an exterior assembly;

an interior assembly;

a latch having a deadbolt movable between an extended position and a retracted position, the latch being movable in response to rotation of a torque blade, the latch positioned at least partially within a mortise;

a motor included within the interior assembly and operable to rotate the torque blade;

a control circuit operatively connected to the motor and configured to selectively actuate the motor; and a mortise insert mounted within the mortise, the mortise insert defining a housing, the mortise insert including a battery subassembly positioned within the housing, the battery subassembly electrically connectable to the control circuit, the latch positioned at least partially within the housing, the battery subassembly being removable from the housing independent of the latch.

20. The electronic lock assembly of claim 19, wherein the control circuit is included in the mortise insert.

21. The electronic lock assembly of claim 19, wherein the motor is included within the housing of the mortise insert.

22. The electronic lock assembly of claim 19, wherein a wireless communication interface is positioned within the housing of the mortise insert.

23. The electronic lock assembly of claim 19, wherein the control circuit, the motor, and a wireless communication interface are positioned within the housing of the mortise insert.

* * * * *